May 21, 1940.　　　　P. F. SCHOEN　　　　2,201,654
MILLING MACHINE
Filed Aug. 25, 1938　　　　2 Sheets-Sheet 1
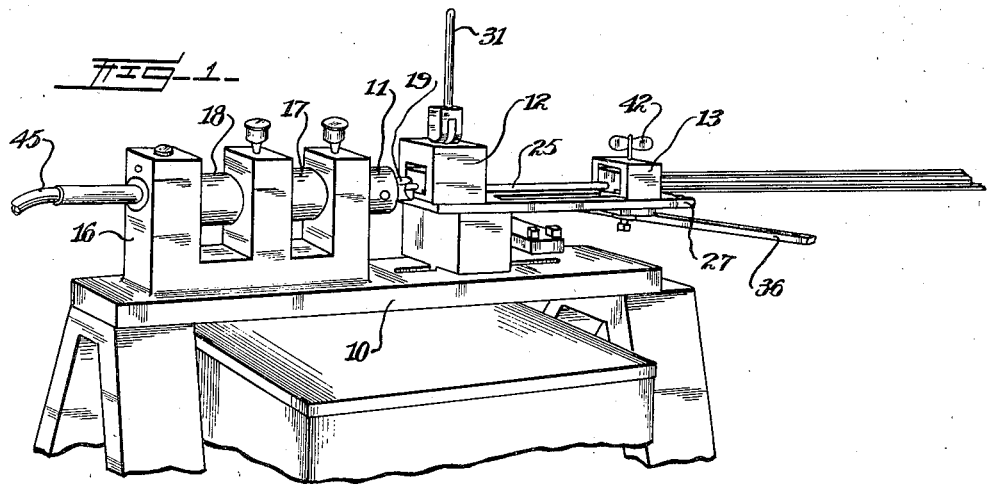
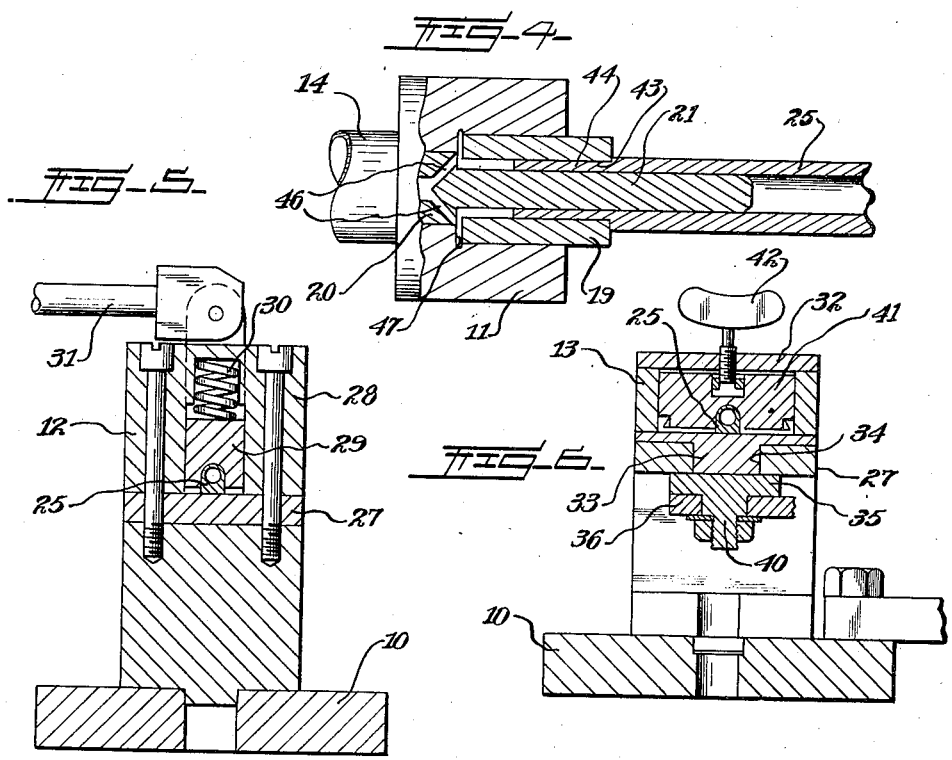
INVENTOR.
Paul F. Schoen.
BY Ramsey, Kent, Chisholm and Lutz
ATTORNEY.

May 21, 1940.  P. F. SCHOEN  2,201,654
MILLING MACHINE
Filed Aug. 25, 1938   2 Sheets-Sheet 2
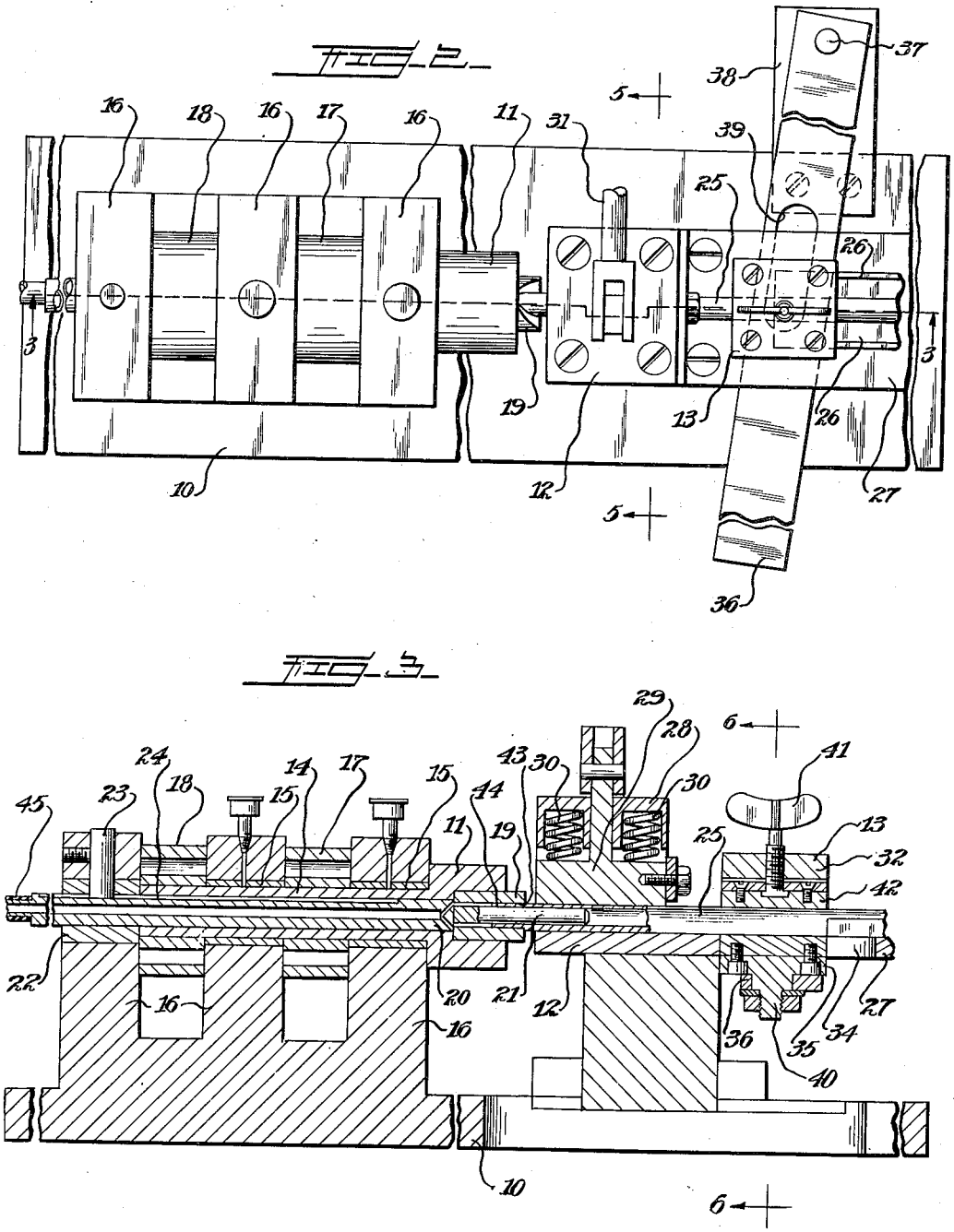
INVENTOR.
Paul F. Schoen.
BY
Ramsey, Kent, Chisholm and Lutz
ATTORNEY.

Patented May 21, 1940

2,201,654

UNITED STATES PATENT OFFICE 2,201,654

MILLING MACHINE

Paul F. Schoen, Dearborn, Mich., assignor to Bohn Aluminum & Brass Corporation, Detroit, Mich., a corporation of Michigan Application August 25, 1938, Serial No. 226,775

10 Claims. (Cl. 90—18)

This invention relates to milling machines and aims to produce a machine for milling the outside of a piece having irregular exterior contour to produce a tube having a wall of uniform thickness.

A particular feature of the invention resides in the provision of a pilot rod which engages in the opening of the work piece and which keeps the work piece concentric with the hollow cutter and prevents oil or chips from gaining entrance to the opening through the work piece.

Another special feature is found in the stationary guide which conforms exactly with the original exterior contour of the work piece and assists in guiding the work piece to the cutter.

A novel feature is the provision of a pilot structure which engages the bore of the work piece, and which serves simultaneously to guide the work piece and to conduct lubricant to the cutters.

These and other features and advantages of the invention will become apparent as the description proceeds.

While a preferred form of the invention is illustrated and described herein it should be understood that various changes may be made in the construction without departing from the spirit of the invention as herein set forth and claimed.

In the drawings:

Fig. 1 is a perspective of a machine embodying the invention.

Fig. 2 is a plan view of the main body of the machine, part being broken away.

Fig. 3 is a section on line 3—3 of Fig. 2.

Fig. 4 is an enlarged section corresponding to part of Fig. 3.

Fig. 5 is a section on line 5—5 of Fig. 2.

Fig. 6 is a section on line 6—6 of Fig. 3.

Referring in general to the drawings, the machine includes a bed plate 10, a milling head 11, a stationary guide 12, and a feed clamp 13.

As shown in detail in Fig. 3, the milling head 11 is formed on one end of a tubular shaft 14, which rotates in suitable bearings 15 mounted in supports 16 which extend upwardly from the bed plate. A pulley 17 keyed to shaft 14 provides means for driving the shaft from a power source, and a second pulley 18 is used to operate an oil pump, not shown.

A milling cutter 19 is mounted in the socket of milling head 11, the tubular opening through the cutter 19 corresponding with the desired exterior size of the finished work piece.

The pilot tube 20 extends through the bore in tubular shaft 14 and has a close rotative fit therewith. A reduced end 21 (Figs. 3 and 4) on the pilot tube forms a pilot which fits closely within the tubular opening in the work piece, and which accurately guides the work piece to insure a tubular wall of uniform thickness in the finished work piece. A collar 22 is mounted in the rear support 16, and a pin 23 engages in a slot 24 in pilot tube 20 to prevent rotation of the pilot tube but to permit it to move longitudinally.

The work piece is a strip of extruded aluminum having, as shown in Figs. 2 and 6, a main body 25 pierced with a tubular opening, and lateral flanges 26. The operation performed on the machine is intended to form the end of body 25 into a tube projecting from the strip that can be joined to other pipes, for example, those of a refrigeration system. Preparatory to the operation in this machine the flanges 26 are cut away at one end of the strip, leaving an end of body 25 projecting, said end having the shape shown in cross-section in Fig. 6.

The mechanism used to guide and feed the strip to the cutter includes a plate 27 rigidly supported from bed plate 10. The stationary guide 12, which is mounted on plate 27, includes a housing 28 in which a presser foot 29 is normally pressed downwardly upon the top of the strip body by springs 30, and is moved upwardly for insertion or removal of the strip by a cam lever 31. The lower face of presser foot 29 is formed with a longitudinal groove which conforms exactly (as shown in Figs. 3 and 5) with the curved upper wall and straight side walls of the strip body 25. The parts are so arranged that when the strip is pushed through the stationary guide against the frictional resistance caused by springs 30, the center of the bore through body 25 is alined with the center of the pilot 21 and of the hollow cutter 19.

The feed clamp 13 (Figs. 3 and 6) includes a housing 32 which has a downward extension 33 slidably engaged in a slot 34 formed in plate 27, and which is held in contact with plate 27 by a lock plate 35. The feed clamp may be reciprocated relative to the cutter by any suitable device, the form illustrated consisting of a manual lever 36 having its rear end pivoted at 37 to an arm 38 attached to bed plate 10, and its intermediate part formed with a slot 39 which has sliding engagement with a stud 40 projecting downwardly from the lock plate 35. A clamp block 42 has its lower face shaped to conform to the upper surface of the work strip, and is reciprocated by a thumb screw 41.

Prior to operation of the machine the end of the work strip is prepared by removing part of each flange 26 as previously explained. The prepared end is then threaded through feed clamp 13, the clamp block 41 being in a raised position, and through the stationary guide 12, the presser foot 29 being elevated. As the end of body 25 of the strip goes through the stationary guide the tubular bore through body 25 passes over the end of pilot 21, as clearly indicated in Fig. 3. When the body 25 is adjacent the cutter 19, the feed clamp 13 being at the right hand end of its travel, as illustrated in Fig. 1, the clamp block 41 is tightened down upon the strip by turning the thumb screw 42 and presser foot 29 is lowered against the top of the strip by moving lever 31 to its horizontal position.

Power is now applied to pulley 17 and as the cutter 19 rotates the body 25 is moved forward into engagement with the cutting edges 43 which remove the excess material beyond a circle which defines the outer wall of a tube 44 concentric with the bore through the body 25.

Lubrication for the cutting operation is furnished by leading oil from the oil pump (not shown) through the hose 45 to the pilot tube 20, and from there by way of the holes 46 (Figs. 3 and 4) to the interior of cutter 19.

In Figs. 3 and 4 the parts are shown in the positions they assume after the cutter has formed a tube 44 of short length extending into the cutter. A tube of considerably greater length can be produced by removing the flanges 26 from a greater length of the body 25. As the finished tube 44 is advanced through cutter 19 it finally engages shoulder 47 at the junction of pilot 21 with pilot tube 20, and further advance of tube 44 presses pilot tube 20 toward the left, as viewed in Fig. 3 and causes its left end to recede from collar 22. During the operation on the end of the work strip its main body, part of which is shown extending toward the right in Fig. 1, is suitably supported with its lower face approximately in the plane of the upper face of plate 27.

The pilot 21 in addition to serving as a guide for the advancing work also acts as a stopper, since it closely engages the wall of the bore in body 25 and excludes oil and cuttings from the bore.

As the result of the operation in this machine the work strip has formed on it a tube 44 having a wall of uniform thickness, which is adapted to be coupled to other pipes by any suitable means, such as by a flare tube coupling, welding, etc.

I claim:

1. A milling machine comprising a hollow cutter, a pilot pin located on the axis of the hollow cutter and defining a tubular space between the pin and the inner wall of the hollow cutter, and a stationary guide arranged to guide a work piece having a tubular bore and an irregular exterior contour so as to cause the tubular bore to pass over the pilot pin.

2. A milling machine comprising a tubular rotatable shaft, a hollow cutter rotatable with the shaft, a non-rotatable pilot tube extending through the tubular shaft, a pilot pin mounted on one end of the pilot tube and adapted to project into the hollow cutter, and a stationary guide arranged to guide a work piece having a tubular bore and an irregular exterior contour as to cause the tubular bore to pass over the pilot pin.

3. A milling machine comprising a tubular rotatable shaft, a hollow cutter rotatable with the shaft, a non-rotatable pilot tube extending through the tubular shaft, the pilot tube being reciprocable along the axis of the hollow shaft, a pilot pin mounted on one end of the pilot tube and adapted to project into the hollow cutter, and a stationary guide arranged to guide a work piece having a tubular bore and an irregular exterior contour so as to cause the tubular bore to pass over the pilot pin.

4. A milling machine adapted to operate upon a work strip having a body formed with an irregular exterior contour and a cylindrical bore, said machine comprising, a stationary guide formed with an opening adapted to closely engage the exterior of said body, a pilot pin adapted to closely engage the cylindrical bore, and a hollow cutter adapted to remove material from the exterior of the body to give it a cylindrical contour concentric with the cylindrical bore thereof.

5. A milling machine adapted to operate upon a work strip having a body formed with an irregular exterior contour and a cylindrical bore, said machine comprising, a stationary guide formed with an opening adapted to closely engage the exterior of said body, a pilot pin adapted to closely engage the cylindrical bore, a hollow cutter adapted to remove material from the exterior of the body to give it a cylindrical contour concentric with the cylindrical bore thereof, and means to feed the work strip into the hollow cutter.

6. A milling machine adapted to operate upon a work strip having a body formed with an irregular exterior contour and a cylindrical bore, said machine comprising, a stationary guide formed with an opening adapted to closely engage the exterior of said body, a tubular shaft having its axis alined with the axis of the cylindrical bore of the work strip, a hollow cutter mounted on the shaft, a non-rotatable pilot tube extending through the tubular shaft, a pilot carried by the pilot tube and adapted to extend within the hollow cutter and engage the cylindrical bore of the work strip, the hollow cutter being adapted to remove material from the exterior of the body to give it a cylindrical contour concentric with the cylindrical bore thereof, and means to feed the work strip into the hollow cutter.

7. A milling machine adapted to operate upon a work strip having a body with a rounded top wall, flat side walls and a flat bottom wall, said machine comprising, a stationary guide having a flat floor which receives the flat bottom wall of the strip body, a vertically movable presser foot formed with a channel which closely engages the rounded top wall and flat side walls of the body, spring means for forcing the presser foot down upon the strip body, a hollow cutter having its axis alined with a bore formed in the body of the work strip and adapted to remove material from the exterior of the body to give it a cylindrical contour concentric with the cylindrical bore thereof, and means to feed the work strip into the hollow cutter.

8. A milling machine adapted to operate upon a work strip having a body with a rounded top wall, flat side walls and a flat bottom wall, said machine comprising, a stationary guide having a flat floor which receives the flat bottom wall of the strip body, a vertically movable presser foot formed with a channel which closely engages the rounded top wall and flat side walls of the body, spring means for forcing the presser foot down upon the strip body, a tubular shaft having its axis alined with the axis of the cylindrical bore of the work strip, a hollow cutter mounted on the shaft, a non-rotatable pilot tube extending through the tubular shaft, a pilot carried by the pilot tube and adapted to extend within the hollow cutter and engage the cylindrical bore of the work strip, the hollow cutter being adapted to remove material from the exterior of the body to give it a cylindrical contour concentric with the cylindrical bore thereof, and means to feed the work strip into the hollow cutter.

9. A milling machine comprising a tubular shaft, a hollow cutter mounted on the tubular shaft, a pilot tube extending through the tubular shaft, a pilot pin carried by the pilot tube and adapted to extend into the work piece, means for conducting lubricating fluid to the pilot tube, means permitting escape of the lubricating fluid to the cutting edges of the hollow cutter, and means to guide work to the hollow cutter.

10. A milling machine comprising, a tubular shaft, a hollow cutter mounted on the tubular shaft, the opening through the shaft and cutter being large enough to accommodate the tubular end of the finished work piece, a non-rotatable pilot tube extending through the tubular shaft, the pilot tube being held against rotation, but being retractable along the axis of the tubular shaft, a pilot pin carried by the pilot tube and adapted to extend into the work piece, a conduit connected to the pilot tube for supplying lubricating fluid, means permitting escape of the lubricating fluid to the interior of the hollow cutter, and means to guide the work to the hollow cutter.

PAUL F. SCHOEN.